(12) United States Patent
Wu et al.

(10) Patent No.: US 11,281,257 B2
(45) Date of Patent: Mar. 22, 2022

(54) HOUSINGS WITH ENERGY ABSORBING MATERIALS

(71) Applicant: Hewlett-Packard Development Company, L.P., Spring, TX (US)

(72) Inventors: Kuan-Ting Wu, Taipei (TW); Wei-Chung Chen, Taipei (TW); Chien-Ting Lin, Taipei (TW)

(73) Assignee: Hewlett-Packard Development Company, L.P., Spring, TX (US)

(*) Notice: Subject to any disclaimer, the term of this patent is extended or adjusted under 35 U.S.C. 154(b) by 0 days.

(21) Appl. No.: 16/481,465

(22) PCT Filed: Dec. 14, 2017

(86) PCT No.: PCT/US2017/066355
§ 371 (c)(1),
(2) Date: Jul. 27, 2019

(87) PCT Pub. No.: WO2019/117911
PCT Pub. Date: Jun. 20, 2019

(65) Prior Publication Data
US 2021/0294384 A1 Sep. 23, 2021

(51) Int. Cl.
*G06F 1/16* (2006.01)
*F16F 1/36* (2006.01)

(52) U.S. Cl.
CPC .......... *G06F 1/1656* (2013.01); *F16F 1/3605* (2013.01); *G06F 1/1616* (2013.01); *F16F 2224/02* (2013.01)

(58) Field of Classification Search
CPC .... G06F 1/1656; G06F 1/1616; G06F 1/1637; G06F 1/1679; G06F 1/1662; G06F 1/1681; G06F 1/1601; G06F 1/162; G06F 1/1626; G06F 1/1652; G06F 1/166; G06F 1/1684; G06F 1/169; G06F 1/1694;
(Continued)

(56) References Cited

U.S. PATENT DOCUMENTS 5,566,913 A * 10/1996 Prokop .............. A47B 21/0371 248/118
6,195,255 B1 * 2/2001 Kim .................. A47B 21/0371 248/118.1
(Continued)

FOREIGN PATENT DOCUMENTS

RU 71175 U1 2/2008
RU 2453416 C1 6/2012
WO WO-2006029407 A2 4/2006

OTHER PUBLICATIONS

Curtis, M., How to Replace Your Laptop LCD Rubber Bumpers, Jun. 25, 2010, https://itstillworks.com/replace-laptop-lcd-rubber-bumpers-5911697.html.

*Primary Examiner* — Abhishek M Rathod
(74) *Attorney, Agent, or Firm* — HPI Patent Department

(57) ABSTRACT

In example implementations, a housing is provided. The housing includes a display housing portion, an input housing portion, and an energy absorbing material that is inserted along an edge of the input housing portion. The input housing portion is movably coupled to the display portion. A top surface of the energy absorbing material lies on a same plane as a top surface of the input housing portion.

15 Claims, 4 Drawing Sheets

(58) Field of Classification Search
CPC ............ G06F 2200/1633; G06F 1/1615; F16F 1/3605; F16F 2224/02
See application file for complete search history.

(56) References Cited

U.S. PATENT DOCUMENTS

| | | | |
|---|---|---|---|
| 6,336,614 B1* | 1/2002 | Kwitek ................. | G06F 1/1616 248/118 |
| 6,499,703 B2* | 12/2002 | Chou ................. | A47B 21/0371 248/118 |
| 6,795,306 B2 | 9/2004 | Jeffries et al. | |
| 7,245,484 B2* | 7/2007 | Langerhans .......... | G06F 1/1616 248/615 |
| 8,208,218 B2* | 6/2012 | Nakatani ................ | B65D 85/38 360/97.19 |
| 8,811,004 B2 | 8/2014 | Liu | |
| 9,019,691 B1* | 4/2015 | Matsuoka ............. | G06F 1/1637 361/679.01 |
| 9,405,322 B2 | 8/2016 | Ashcraft et al. | |
| 9,459,662 B2* | 10/2016 | Senatori ................ | G06F 1/1601 |
| 10,001,813 B1* | 6/2018 | Tang ....................... | H02P 31/00 |
| 10,057,996 B2* | 8/2018 | Yeo ........................ | G06F 1/1681 |
| 2003/0131400 A1* | 7/2003 | Clavell .................. | A42B 3/125 2/411 |
| 2006/0002066 A1* | 1/2006 | Doczy ................... | G06F 1/1616 361/679.09 |
| 2007/0243254 A1* | 10/2007 | Edgren ................... | A61P 25/06 424/471 |
| 2009/0151839 A1 | 6/2009 | Miyasaka et al. | |
| 2009/0231805 A1* | 9/2009 | Schlesener ............ | G06F 1/1656 361/679.55 |
| 2011/0037013 A1 | 2/2011 | Ragunathan et al. | |
| 2011/0206471 A1* | 8/2011 | Doshi ................... | C04B 14/302 408/1 R |
| 2012/0091311 A1* | 4/2012 | Rizk ..................... | B25J 17/0208 248/638 |
| 2012/0190772 A1 | 7/2012 | Weng et al. | |
| 2013/0070405 A1* | 3/2013 | Ashcraft ............... | G06F 1/1662 361/679.09 |
| 2014/0284096 A1* | 9/2014 | Wu ........................ | H05K 5/04 174/520 |
| 2017/0011730 A1 | 1/2017 | Seto et al. | |
| 2018/0232012 A1* | 8/2018 | Wu ........................ | C23C 14/22 |

\* cited by examiner

HOUSINGS WITH ENERGY ABSORBING MATERIALS

BACKGROUND

Mobile devices, such as laptop computers, are used to perform complex computations and execute various applications. The mobile devices may contain sensitive electronic components that perform various different functions and power the mobile device.

Mobile devices are also carried around and transported by users. The mobile devices can be jostled around while moving in a backpack, compressed when accidently laid below additional weight, shaken when placed in a moving car or truck, and the like.

DETAILED DESCRIPTION

Examples described herein provide a housing of a device that includes high energy absorbing materials. As discussed above, electronic devices can include fragile electronic components that perform various different functions. When the electronic devices are mobile, the devices may be carried around or transported by the user. The devices can be jostled, constantly vibrated, or slammed shut (e.g., in a clamshell laptop computer).

When the devices are exposed to such vibrations or shock, the electronic components within the device may be damaged. For example, the display may suffer "white spots, or electronic components may become disconnected within the device. The shock and vibration may also cause cosmetic damage, such as scuffing and scratch marks, and the like, on the surfaces of the housing.

Examples described herein provide high energy absorbing materials that can prevent damage to the device. The energy absorbing materials can be designed to prevent damage to the device and/or the electronic components within the device. The energy absorbing materials can be installed in the electronic device in an aesthetically appealing way such that the energy absorbing materials do not protrude from a surface of the housing.

Figure 1:
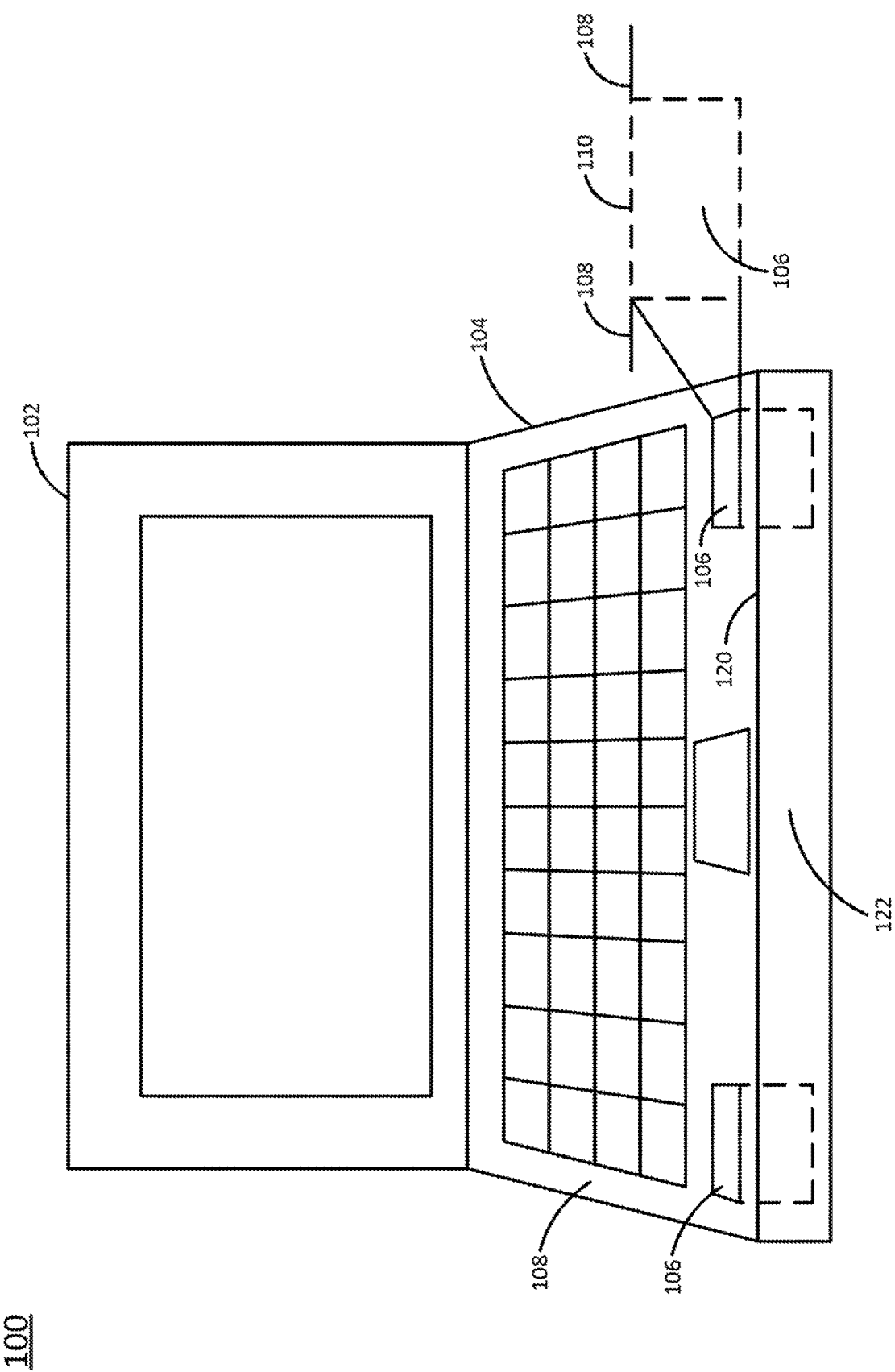
FIG. 1 is a schematic view of an example of an apparatus of the present disclosure.

FIG. 1 illustrates an apparatus 100. The apparatus 100 may be a mobile device such as a laptop computer, or any other device that may have housing that closes shut. In one example, the apparatus 100 may include a display housing portion 102 and an input housing portion 104. The display housing portion 102 may be movably coupled to the input housing portion 104.

In one example, the display housing portion 102 may include components associated with a display of the apparatus 100. The input housing portion 104 may include components associated with input devices such as a keyboard, touch pad, and the like. Electronic components such as a processor, a memory, network interface cards, and the like, may be located inside of the input housing portion 104.

In one example, the input housing portion may include an energy absorbing material 106. The energy absorbing material 106 may be inserted along an edge 120 of the input housing portion 104. In one example, "along an edge 120" may be defined to be on a top surface 108 of the input housing portion 104 and near or adjacent to a point where the top surface 108 and perimeter surface (e.g., a front side 122 of the input housing portion 104) meet. In other words, "along an edge 120" may include any area on the top surface 108 that is located between the edge 120 of the input housing portion 104 and input devices (e.g., the keyboard, touchpad, and the like) located on the top surface 108 of the input housing portion 104.

FIG. 1 illustrates a schematic cross-sectional view to the side that shows a top surface 110 of the energy absorbing material 106 and the top surface 108 of the input housing portion 104. In one example, the energy absorbing material 106 may be inserted such that the top surface 110 of the energy absorbing material 106 and the top surface 108 of the input housing portion 104 lie on the same plane. Said another way, the top surface 108 and the top surface 110 form a single substantially flat plane.

As a result, the energy absorbing material 106 may appear to be part of the input housing portion 104. The energy absorbing material 106 may be painted or colored to be substantially similar to the color of the input housing portion 104. Thus, the energy absorbing material 106 is installed into the input housing portion 104 in an aesthetically pleasing way without any protrusions, or bumps, that stick out of the input housing portion 104 or the display housing portion 102.

In one example, the energy absorbing material 106 may absorb shock and vibrations to prevent damage to the display, the electronic components within the apparatus 100, cosmetic damage to a surface of the display housing portion 102 and the input housing portion 104, and the like. The dimensions of the energy absorbing material 106 may be a function of a size of the apparatus 100 or the input housing portion 104. For example, the thickness of the energy absorbing material 106 may be less than a thickness (e.g., a height of the front side 122) of the input housing portion 104. The length and width of the energy absorbing material 106 may be a function of how much space is available on the top surface 108 between the input devices and the edge 120.

Although two energy absorbing materials 106 are illustrated in FIG. 1, it should be noted that any number of energy absorbing materials 106 may be installed in the input housing portion 104. For example, a single energy absorbing material 106 may be deployed or more than two energy absorbing materials 106 may be deployed.

In one example, the energy absorbing material 106 may be any type of shear thickening material. A shear thickening material may be a material in which viscosity increases with the rate of shear strain. Examples of shear thickening materials may include 0.2 to 1.0 weight percent polyethylene oxide having a weight of approximately 95,000 to 600,000 grams per mole, 0.1 to 15 weight percent silica aerogel, 0.1 to 5.0 weight percent platy nano-clay having an aspect ratio of approximately 10 to 1,500, and the like.

The energy absorbing material 106 may be mechanically inserted into an opening of the input housing portion 104 after the input housing portion 104 is molded. In another example, the input housing portion 104 may be over-molded with the energy absorbing material 106 at the desired location along the edge 120 of the input housing portion 104.

Figure 2:
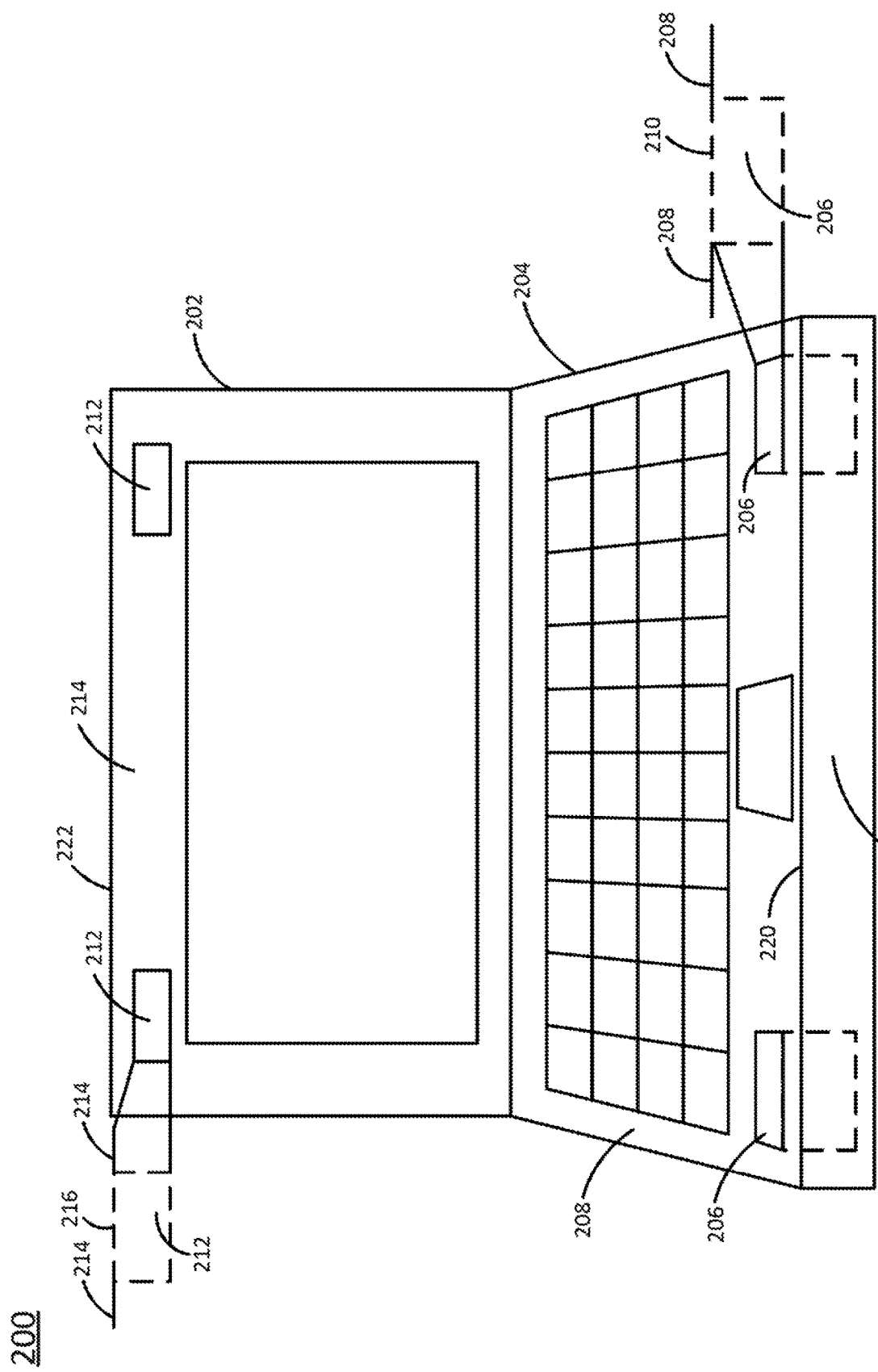
FIG. 2 is a schematic view of another example of an apparatus of the present disclosure.

FIG. 2 illustrates an example of an apparatus 200. In one example, the apparatus 200 may be any type of mobile device such as a laptop computer, or any other device that may have a housing that closes shut. In one example, the apparatus 200 may include a display housing portion 202 and an input housing portion 204. The display housing portion 202 may be movably coupled to the input housing portion 204.

In one example, the display housing portion 202 may include components associated with a display of the apparatus 200. For example, the display housing portion 202 may include a cover glass, a touch screen, a light source to illuminate the display, a camera, and the like. The input housing portion 204 may include components associated with input devices such as a keyboard, touch pad, and the like. Electronic components such as a processor, a memory, network interface cards, and the like, may be located inside of the input housing portion 204.

In one example, the input housing portion may include an energy absorbing material 206. The energy absorbing material 206 may be similar to the energy absorbing material 106 described above. The energy absorbing material 206 may be inserted along an edge 220 of the input housing portion 204. In one example, "along an edge 220" may be defined to be the same as the edge 120 defined above. For example, the "along an edge 120" may be defined to mean on a top surface 208 of the input housing portion 204 and near or adjacent to a point where the top surface 208 and perimeter surface (e.g., a front side 232 of the input housing portion 204) meet.

FIG. 2 illustrates a schematic cross-sectional view to the side that shows a top surface 210 of the energy absorbing material 206 and the top surface 208 of the input housing portion 204. In one example, the energy absorbing material 206 may be inserted such that the top surface 210 of the energy absorbing material 206 and the top surface 208 of the input housing portion 204 lie on the same plane. Said another way, the top surface 208 and the top surface 210 form a single substantially flat plane.

In one example, the display housing portion 202 may also include energy absorbing materials 212 along an edge 222. In one example, "along an edge 222" may be defined to be the same as "along an edge 120" or "along an edge 232," as defined above.

The energy absorbing materials 212 may be the same materials as the energy absorbing materials 206. In another example, the energy absorbing materials 212 may be different materials than the energy absorbing materials 206. However, both the energy absorbing materials 206 and 212 are shear thickening materials. In other words, the energy absorbing material 206 may be the same or a different shear thickening material than the energy absorbing material 212.

The energy absorbing materials 212 may also be inserted into the display housing portion 202. FIG. 2 also illustrates a schematic cross-sectional view to the side that shows a top surface 216 of the energy absorbing material 212 and a top surface 214 of the display housing portion 202. In other words, the top surface 214 of the display housing portion 202 and the top surface 216 of the energy absorbing material 212 may lie on the same plane. Said another way, the top surface 214 and the top surface 216 form a single substantially flat plane.

As a result, the energy absorbing materials 212 and 206 may appear to be part of the display housing portion 202 and input housing portion 204, respectively. The energy absorbing materials 212 and 206 may be painted or colored to be substantially similar to the color of the display housing portion 202 and input housing portion 204. Thus, the energy absorbing materials 212 and 206 are installed in an aesthetically pleasing way without any protrusions, or bumps, that stick out of the display housing portion 202 or the input housing portion 204.

The dimensions of the energy absorbing material 212 and 206 may be a function of a size of the apparatus 200 or the display housing portion 202 and the input housing portion 204, respectively. For example, the thickness of the energy absorbing material 206 may be less than a thickness (e.g., a height of the front side 232) of the input housing portion 204. The length and width of the energy absorbing material 206 may be a function of how much space is available on the top surface 208 between the input devices and the edge 220. The dimensions of the energy absorbing material 212 may similarly be a function of a size of the display housing portion 202.

Although two energy absorbing materials 206 and two energy absorbing materials 212 are illustrated in FIG. 2, it should be noted that any number of energy absorbing materials 206 may be installed in the input housing portion 204 and any number of energy absorbing materials 212 may be installed in the display housing portion 202.

Figure 3:
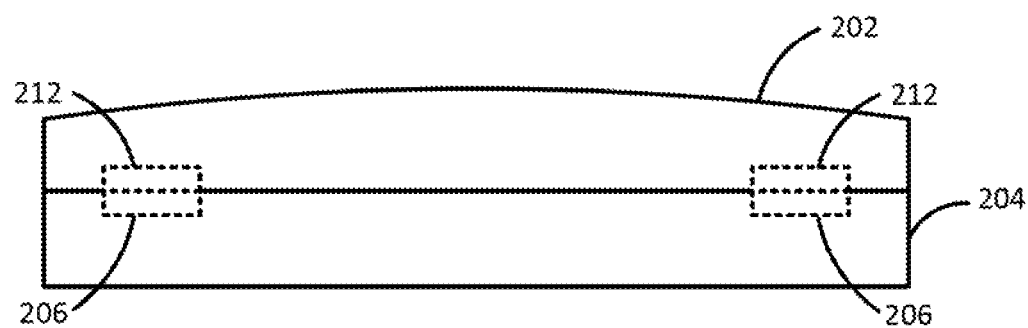
FIG. 3 illustrates an example front view of the apparatus in a closed position.

In one example, the energy absorbing materials 212 may be located along the edge 232 and correspond to a location of the energy absorbing materials 206 in the input housing portion 204. For example, FIG. 3 illustrates an example front view of the apparatus 200 in a closed position. FIG. 3 illustrates how the energy absorbing materials 212 may overlap with the energy absorbing materials 206 when the display housing portion 202 is closed on top of the input housing portion 204. Said another way, when the display housing portion 202 is closed on top of the input housing portion 212, the energy absorbing material 212 may be in a same location (e.g., same x and y coordinates when looking down on the apparatus 200) as the energy absorbing material 206.

Figure 4:
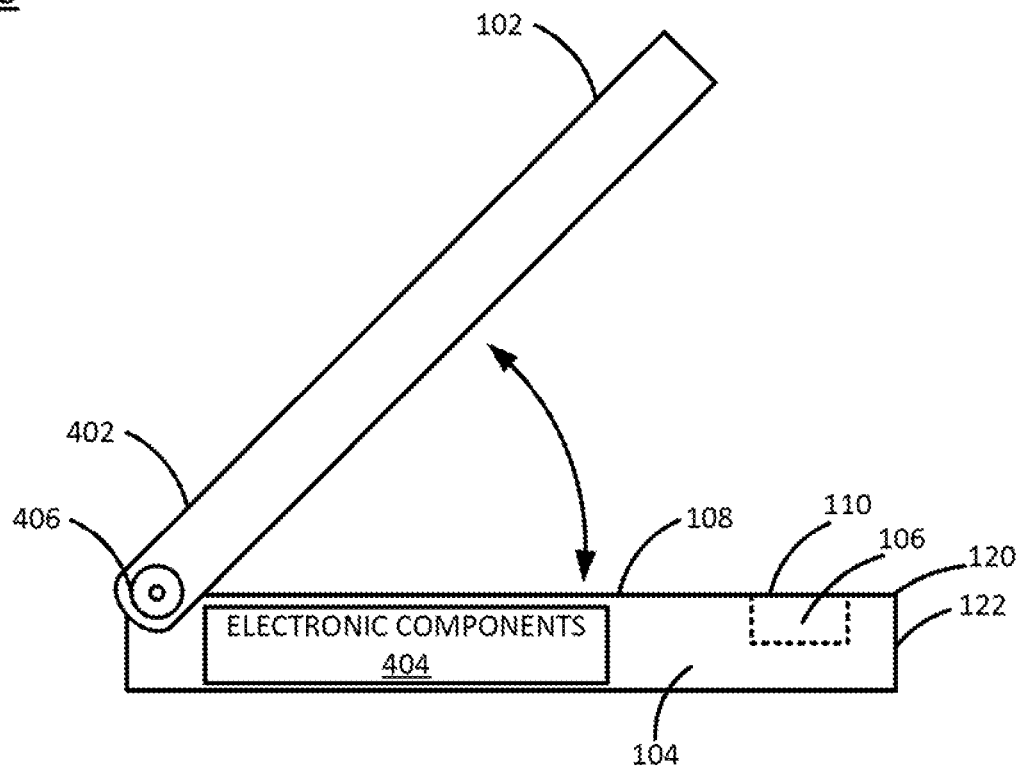
FIG. 4 illustrates a side view of an example of an apparatus of the present disclosure.

FIG. 4 illustrates a side view of the apparatus 100. For example, the display housing portion 102 and the input housing portion 104 may form a foldable housing 402. The display housing portion 102 and the input housing portion 104 may be coupled via a mechanical connection 406 that allows the display housing portion 102 to close on top of the input housing portion 104. The mechanical connection 406 may be a rotatable screw or hinge.

The input housing portion 104 may include a plurality of electronic components 404, as noted above. The electronic components may include a processor, a computer readable medium, network interface cards, wireless communication radios, and the like.

FIG. 4 also illustrates the energy absorbing materials 106 inserted along an inside edge 120 of the foldable housing 402. As noted above, the top surface 110 of the energy absorbing material 106 may lie on a same plane as the top surface 108 of the inside edge 120 of the foldable housing 402. The "inside edge 120" may refer to a portion of the top surface 108 along the edge 120 of the input housing portion 104.

Figure 5:
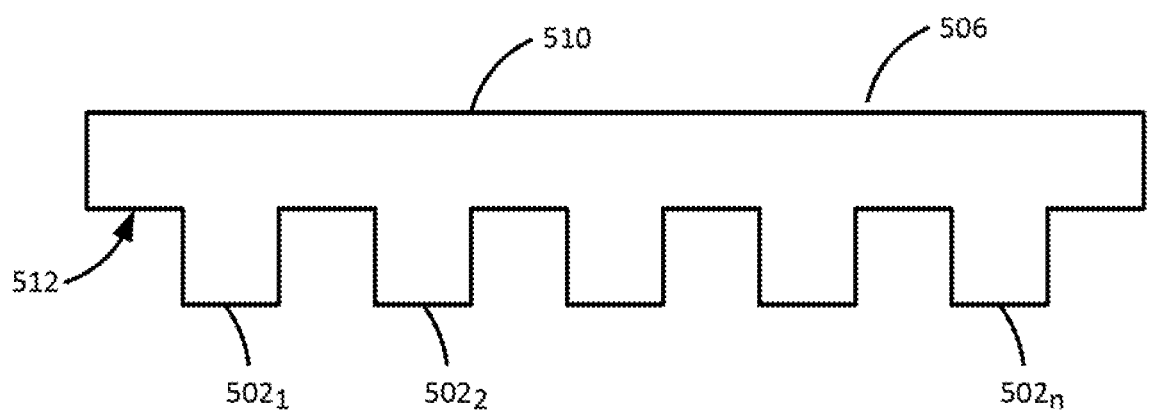
FIG. 5 illustrates a side view of an example of the energy absorbing material.

FIG. 5 illustrates a side view of an example of an energy absorbing material 506 that includes a patterned surface. For example a surface 512 that is opposite a top surface 510 (e.g., the top surface 510 may be a surface that lies on the same plane as a top surface of a housing portion, similar to the top surface 110, 210, and 216 illustrated in FIGS. 1 and 2) may include an uneven surface. For example, the uneven surface may comprise a plurality of protrusions $502_1$ to $502_n$ (hereinafter referred to individually as a protrusion 502 or collectively as protrusions 502). The protrusions 502 may be deployed in an alternating pattern or randomly across the surface 512. When viewing the energy absorbing material 506 from the bottom, the protrusions 502 would be deployed across an entire length and width of the energy absorbing material 506 randomly or in the alternating pattern.

In one example, the protrusions 502 may have a polygonal shape (e.g., a rectangle, square, triangle, and the like). In another example, the protrusions 502 may be a mound shape or a hemi-spherical shape. The protrusions 502 allow the energy absorbing material 506 to absorb more energy than an energy absorbing material deployed without the protrusions 502 (e.g., in a solid block, cube, rectangular cuboid, and the like).

Figure 6:
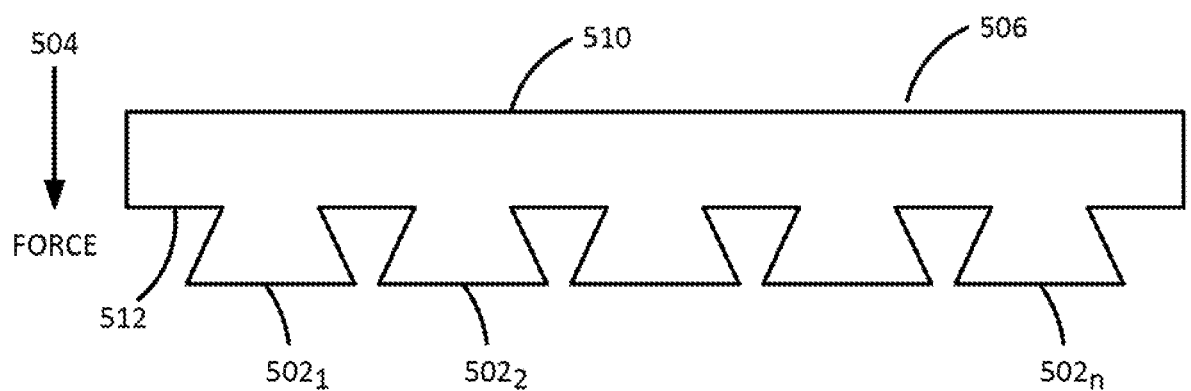
FIG. 6 illustrates a side view of an example of the energy absorbing material under an impact force.

FIG. 6 illustrates an example side view of the energy absorbing material 506 under an impact force 504. For example, as the impact force 504 is applied on top of the top surface 510 in a direction as illustrated by the arrow, the protrusions 502 may deform. For example, the impact force 504 may be absorbed by the deformation of the protrusions 502 rather than by the electronic components or surfaces of an apparatus (e.g., the apparatus 100 or 200).

After the impact force 504 is dissipated, the protrusions 502 may gradually reform into the original shape. For example, if the protrusions 502 started as rectangular shapes as illustrated in FIG. 5, the protrusions 502 may be deformed by the impact form 504 as illustrated in FIG. 6 and then return to the original rectangular shape as illustrated in FIG. 5.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

The invention claimed is:

1. A housing, comprising:
    a display housing portion;
    an input housing portion movably coupled to the display portion; and
    an energy absorbing material inserted along an edge of the input housing portion, wherein a top surface of the energy absorbing material lies on a same plane as a top surface of the input housing portion and appears as part of the input housing portion.

2. The housing of claim 1, wherein the energy absorbing material comprises a shear thickening material.

3. The housing of claim 2, wherein the energy absorbing material comprises 0.2 to 1.0 weight percent polyethylene oxide having a weight of approximately 95,000 to 600,000 grams per mole.

4. The housing of claim 2, wherein the energy absorbing material comprises 0.1 to 15 weight percent silica aerogel.

5. The housing of claim 2, wherein the energy absorbing material comprises 0.1 to 5 weight percent platy nano-clay having an aspect ratio of approximately 10 to 1,500.

6. The housing of claim 1, wherein a side of the energy absorbing material that is opposite the top surface of the input housing portion comprises an uneven surface.

7. The housing of claim 6, wherein the uneven surface comprises an alternating pattern of protrusions.

8. A housing, comprising:
    a display housing portion;
    a first energy absorbing material inserted along an edge of the display housing portion, wherein a top surface of the first energy absorbing material lies on a same plane as a top surface of the display housing portion and appears as part of the display housing portion;
    an input housing portion movably coupled to the display portion; and
    a second energy absorbing material inserted along an edge of the input housing portion that corresponds to the edge of the display housing portion where the first energy absorbing material is inserted, wherein a top surface of the second energy absorbing material lies on a same plane as a top surface of the input housing portion and appears as part of the input housing portion.

9. The housing of claim 8, wherein the first energy absorbing material and the second energy absorbing material comprise 0.2 to 1.0 weight percent polyethylene oxide having a weight of approximately 95,000 to 600,000 grams per mole.

10. The housing of claim 8, wherein the first energy absorbing material and the second energy absorbing material comprise 0.1 to 15 weight percent silica aerogel.

11. The housing of claim 8, wherein the energy first energy absorbing material and the second energy absorbing material comprise 0.1 to 5 weight percent platy nano-clay having an aspect ratio of approximately 10 to 1,500.

12. The housing of claim 8, wherein the first energy absorbing material and the second energy absorbing material comprise a patterned surface.

13. The housing of claim 12, wherein patterned surface comprises an alternating pattern of polygon-shaped protrusions.

14. An apparatus, comprising:
    a plurality of electronic components;
    a foldable housing to enclose the plurality of electronic components; and
    an energy absorbing material inserted along an inside edge of the foldable housing; wherein a top surface of the energy absorbing material lies on a same plane as a top surface of the inside edge of the foldable housing and appears as part of the foldable housing.

15. The apparatus of claim 14; wherein the energy absorbing material comprises at least one of polyethylene oxide, silica aerogel, or platy nano-clay.

* * * * *